United States Patent
Fanton et al.

(10) Patent No.: US 6,858,155 B1
(45) Date of Patent: Feb. 22, 2005

(54) FERRITE MATERIALS, METHODS OF PREPARING THE SAME, AND PRODUCTS FORMED THEREFROM

(75) Inventors: Mark A. Fanton, Cabot, PA (US); Joseph F. Huth, III, Butler, PA (US)

(73) Assignee: Spang & Company, Pittsburgh, PA (US)

( * ) Notice: Subject to any disclaimer, the term of this patent is extended or adjusted under 35 U.S.C. 154(b) by 217 days.

(21) Appl. No.: 10/020,819

(22) Filed: Dec. 12, 2001

(51) Int. Cl.$^7$ ............................. C04B 35/38; H01F 1/10
(52) U.S. Cl. ............................... 252/62.62; 252/62.63; 252/62.59
(58) Field of Search ........................... 252/62.62, 63.63, 252/62.59

(56) References Cited

U.S. PATENT DOCUMENTS

| | | | |
|---|---|---|---|
| 2,886,529 A | * | 5/1959 | Guillaud .................. 252/62.62 |
| 3,415,751 A | | 12/1968 | Hirota et al. |
| 3,481,876 A | | 12/1969 | Hiraag et al. |
| 3,652,416 A | | 3/1972 | Sugano et al. |
| 3,769,219 A | | 10/1973 | Sugano et al. |
| 4,863,625 A | | 9/1989 | Roelofsma et al. |
| 5,143,638 A | | 9/1992 | Yamazaki et al. |
| 5,368,763 A | | 11/1994 | Yamazaki et al. |
| 5,518,642 A | | 5/1996 | Inoue et al. |
| 5,846,448 A | | 12/1998 | Yasuhara et al. |
| 5,871,662 A | * | 2/1999 | Van Der Zaag et al. . 252/62.62 |
| 2002/0036472 A1 | * | 3/2002 | Kurachi et al. ............. 315/246 |

FOREIGN PATENT DOCUMENTS

| | | |
|---|---|---|
| EP | 0 551 907 A2 | 7/1993 |
| EP | 1 101 736 A1 | 5/2001 |
| JP | 05-335132 | 12/1993 |
| JP | 6-325920 | * 11/1994 |
| JP | 2000-182816 | 6/2000 |

OTHER PUBLICATIONS

"New Ferrite Material for High Frequency Power Transformers", M. Bogs, M. Esguerra, W. Holubarsch, Power Conversion, Jun. 1993 Proceedings, pp. 361–370.
"A New Power Ferrite For High Frequency Switching Power Supplies", Tadakatsu Sano, Akira Morita, Atsuto Matsukawa, May 1988 Proceedings, pp. 85–99.
"Magnetic Properties of Co and Ti Co–Substituted Mn Zn Ferrites", M. T. Johnson, Proceedings ICF0 5, 1989, India, pp. 399–403.
Abstract of "Effect of dopants on the magnetic properties of MnZn ferrites for high frequency power supplies", A. Znidarsic, M Limpeo, M.; Drofenik, IEEE Transactions on Magnetics (Institute of Electrical and Electronics Engineers) (United States).
"Influence of Additives on Losses Mechanisms for Mn–Zn Ferrites Properties at High Frequency (1 MHz)", Ph, Garrin, B. Lloret, R. Lebourgeois, Magnetic Ceramics, pp. 139–145.
"Magnetic Properties of Mn–Zn Ferrites with Fine Grain Sizes for High–Frequency Transformer", A. Makino, Y. Yamamoto, New Horizons for Materials, pp. 361–368.

* cited by examiner

Primary Examiner—C. Melissa Koslow
(74) Attorney, Agent, or Firm—Kirkpatrick & Lockhart LLP

(57) ABSTRACT

Ferrite materials, methods of forming the same, and products formed therefrom are disclosed, comprising, as main components, an iron oxide ranging from 55.5 to 58.0 mole percent calculated as $Fe_2O_3$, an amount of manganese oxide ranging from 38.0 to 41.0 mole percent calculated as MnO, and an amount of zinc oxide ranging from 3.3 to 4.7 mole percent calculated as ZnO. The present invention also includes, as minor components, an amount of calcium oxide ranging from 0.030 to 0.100 weight percent calculated as CaO, an amount of silicon oxide ranging from 0.015 to 0.040 weight percent calculated as $SiO_2$, and an amount of niobium oxide ranging from 0.010 to 0.030 weight percent calculated as $Nb_2O_5$.

19 Claims, No Drawings

FERRITE MATERIALS, METHODS OF PREPARING THE SAME, AND PRODUCTS FORMED THEREFROM

TECHNICAL FIELD

The present invention relates to ferrite materials, and, more particularly, to manganese-zinc ferrite materials, methods of forming the same, and products made therefrom.

BACKGROUND

Ferrite materials, such as manganese-zinc ferrite compounds, have been widely used as magnetic core materials for transformers in power supply systems, as well as for household electric appliances, communication and telecommunication equipment, computer and peripheral equipment, electronics finished products, electronic components, and other products that employ high frequency electronic circuitry. Ferrite materials have been found to exhibit properties such as, high permeability, high saturation magnetic flux density, high temperature stability, and low power losses that make these materials suitable for high frequency applications. For example, in transformer applications for power supply systems, sintered ferrite materials provide relatively low power losses and high temperature stability when used at relatively high switching frequencies. Typically, with switching frequencies ranging from 100 kHz to 500 kHz, power losses are measured to be about 300 milliwatts per cubic centimeter (mW/cm$^3$) or greater, and Curie temperatures range from 230° C. to 240° C. As used herein, Curie temperature refers to the critical temperature at which ferrite materials substantially lose their magnetic characteristics. It is the combined benefits of relatively low power losses and high temperature stability, for example, that make ferrite compositions particularly well suited for various and wide ranging high frequency electrical applications.

Due, in part, to the increased demand for employing high frequency electronic circuitry into a wide range of components and equipment, efforts have been made to advance the ways in which power supplies can be improved and/or miniaturized for integration into these applications. This demand, at times, has been tempered by the premium that is placed on the available space inside these components. Typically, these efforts are directed to improving the ability of the power supply to perform at high temperatures and high frequencies with low core power losses, so that the size can be reduced without sacrificing performance or operation. Thus, much of the attention devoted to the miniaturization process is related to improvements to the material properties of the ferrite materials, and is based on the equation P~fBA, wherein throughput power (P) is proportional to operating frequency (f), magnetic flux density (B), and magnetic cross section (A). Accordingly, increases in operating frequency and/or magnetic flux density allow for reductions in magnetic cross section without sacrificing throughput power. However, one disadvantage of operating power supplies at higher frequencies relates to a corresponding increase in core power losses that often limit the throughput power and result in an overheating of the core. Thus, improving the material properties of ferrite materials should also take into account effects on power losses.

Numerous attempts have been made to improve the chemical formulations of ferrite compositions, or the process conditions in which these compositions are sintered, in order to improve their material properties and allow these materials to operate at higher temperatures and higher frequencies with limited power losses. Some of these attempts are disclosed in U.S. Pat. Nos. 3,415,751, 3,481,876, 3,652,416, 3,769,219, 5,143,638, 5,368,763, 5,518,642, and 5,846,448. These patents disclose the use of various amounts and combinations of $Fe_2O_3$, MnO, and ZnO as major components, and one or more of $Nb_2O_5$, CaO, $SiO_2$, $V_2O_5$, $ZrO_2$, $Al_2O_3$, $SnO_2$, CuO, $Co_3O_4$, $TiO_2$, $Co_2O_3$, $Li_2O$, $Sb_2O_3$, $Ta_2O_5$, for example, as minor components, at various processing conditions, such as sintering temperatures and pressures, that are said to provide improved properties to the ferrite material. One such objective of these attempts is to enhance the resistivity of the ferrite material by improving the grain boundary resistivity and the resistivity of the ferrite grains themselves. For example, along with the major components, prior art compositions for high frequency applications have included relatively large amounts of $Co_3O_4$, $SnO_2$, $TiO_2$, CaO, and the like, or combinations thereof, as minor components, in order to achieve certain material properties and characteristics.

In particular, a common approach to reduce powder losses is to increase the resistivity of the ferrite material in order to reduce eddy current losses at high frequencies. The various auxiliary additives, discussed above, in combination with $Fe_2O_3$, MnO, and ZnO have been investigated to achieve this objective. For example, one known composition that is used that is said to improve high frequency losses at frequencies up to 5 MHz includes 55–59 mol % $Fe_2O_3$, 35–42 mol % MnO, and 6 mol % or less of ZnO, with additions of 0.050–0.300 wt % CaO, 0.005–0.050 wt % $SiO_2$, and 0.010–0.200 wt % of one or more of the following: $ZrO_2$, $Ta_2O_5$, $MoO_3$, $In_2O_3$, $Sb_2O_3$, and $Bi_2O_3$. Grain size of 2–5 μm is preferred in the final sintered body. Compositions outside of these ranges were are said to have higher power losses and lower minimum power loss temperatures. Representative examples of these compositions are shown in Tables 1 and 2, as comparative examples 20–22.

However, it has been found that the prior art materials are difficult to sinter and achieve consistent material properties because of their sensitivity to firing conditions. Thus, there is a continued need to provide ferrite compositions having improved and consistent material properties, such as high temperature stability and low power loss when used at relatively high frequencies, that allow for improvements in the manufacture and performance of high frequency related compounds that incorporate these materials.

SUMMARY

In one embodiment, the present invention provides a ferrite material including, as main components, an iron oxide ranging from 55.5 to 58.0 mole percent calculated as $Fe_2O_3$, an amount of manganese oxide ranging from 38.0 to 41.0 mole percent calculated as MnO, and an amount of zinc oxide ranging from 3.3 to 4.7 mole percent calculated as ZnO. The present invention also includes, as minor components, an amount of calcium oxide ranging from 0.030 to 0.100 weight percent calculated as CaO, an amount of silicon oxide ranging from 0.015 to 0.040 weight percent calculated as $SiO_2$, and an amount of niobium oxide ranging from 0.010 to 0.030 weight percent calculated as $Nb_2O_5$.

Yet another embodiment of the present invention is a power supply or a core for a transformer that includes the ferrite material according to the compositions described immediately above.

Another embodiment of the present invention is a sintered material that may include the ferrite material according to the compositions described immediately above, having a Curie temperature greater than 250° C., Yet another embodiment of the present invention is a sintered material that includes the ferrite material and has a power loss of below 170 mW/cm$^3$ at a frequency of 0.5 MHz and a magnetic flux density of 500 G, a power loss of below 465 mW/cm$^3$ at a frequency of 1.0 MHz and a magnetic flux density of 500 G, or a power loss of below 300 mW/cm$^3$ at a frequency of 3.0 MHz and a magnetic flux density of 100 G, at a temperature range between 80° C. and 140° C.

Another embodiment of the present invention is a sintered material having a power loss at or below 100 mW/cm$^3$ and a temperature between 80° C. and 140° C. and a frequency of 250 kHz.

Another embodiment of the present invention provides a ferrite material consisting essentially of, as main components, an amount of iron oxide ranging from 55.5 to 58 mole percent calculated as $Fe_2O_3$, an amount of manganese oxide ranging from 38.1 to 40.5 mole percent calculated as MnO, and an amount of zinc oxide ranging from 3.3 to 4.7 mole percent calculated as ZnO, and, as minor components, an amount of calcium oxide ranging from 0.035 to 0.100 mole percent calculated as CaO, an amount of silicon oxide ranging from 0.020 to 0.040 mole percent calculated as $SiO_2$, and an amount of niobium oxide ranging from 0.010 to 0.030 mole percent calculated as $Nb_2O_5$.

In addition, the present invention is directed to a method of forming a ferrite material that includes mixing as main components, an iron component ranging from 55.5 to 58.0 mole percent calculated as $Fe_2O_3$, an amount of manganese component ranging from 38.0 to 41.0 mole percent calculated as MnO, and an amount of zinc component ranging from 3.3 to 4.7 mole percent calculated as ZnO, and mixing as minor components an amount of calcium component ranging from 0.030 to 0.100 weight percent calculated as CaO, an amount of silicon component ranging from 0.015 to 0.040 weight percent calculated as $SiO_2$, and an amount of niobium component ranging from 0.010 to 0.030 weight percent calculated as $Nb_2O_5$. The method further comprises heat treating the major components and the minor components to form the ferrite material.

Yet another embodiment of the present invention is a method of forming a core material that includes mixing as main components, an iron component ranging from 55.5 to 58.0 mole percent calculated as $Fe_2O_3$, an amount of manganese component ranging from 38.0 to 41.0 mole percent calculated as MnO, and an amount of zinc component ranging from 3.3 to 4.7 mole percent calculated as ZnO, and mixing with the main components minor components comprising an amount of calcium component ranging from 0.030 to 0.100 weight percent calculated as CaO, an amount of silicon component ranging from 0.015 to 0.040 weight percent calculated as $SiO_2$, and an amount of niobium component ranging from 0.010 to 0.030 weight percent calculated as $Nb_2O_5$, the main components and the minor components forming a ferrite material. The ferrite material may be pressed to a predetermined density, and sintered to form the core material.

It should be understood that this invention is not limited to the embodiments disclosed in this Summary, but it is intended to cover modifications that are within the spirit and scope of the invention, as defined by the appended claims.

DETAILED DESCRIPTION OF THE PREFERRED EMBODIMENTS

It is to be understood that certain descriptions of the present invention have been simplified to illustrate only those elements and limitations that are relevant to a clear understanding of the present invention, while eliminating, for purposes of clarity, other elements. Those of ordinary skill in the art, upon considering the present description of the invention, will recognize that other elements and/or limitations may be desirable in order to implement the present invention. However, because such other elements and/or limitations may be readily ascertained by one of ordinary skill upon considering the present description of the invention, and are not necessary for a complete understanding of the present invention, a discussion of such elements and limitations is not provided herein. For example, as discussed herein, the materials of the present invention may be incorporated, for example, as core materials for coils or transformers in various power supplies, and the like. Core materials for coils or transformers are understood by those of ordinary skill in the art, and, accordingly, are not described in detail herein.

Furthermore, compositions of the present invention will be generally described in the form of a manganese-zinc ferrite material that may be incorporated as high frequency core materials. It will be understood, however, that the present invention may be embodied in forms and applied to end uses that are not specifically and expressly described herein. For example, one skilled in the art will appreciate that the present invention may be incorporated into high frequency devices other than core materials that are not specifically identified herein.

The term "pulverization," as used herein, refers to mechanically dividing, fragmenting, or disintegrating a material (such as zinc, manganese, and iron oxides or compounds thereof) or other material into a powder. In the method of the present invention, pulverization may be carried out in a manner that provides the resultant powder particles with a desired particle size as described hereinbelow. As used herein, pulverization includes, for example, all forms of mechanically dividing, fragmenting, or disintegrating a larger mass into a powder, including atomization, crushing, milling, grinding, cold stream processing, and the like.

Other than in the operating examples, or unless otherwise expressly specified, all of the numerical ranges, amounts, values and percentages such as those for amounts of materials, times and temperatures of reaction, ratios of amounts, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

The present invention is directed, generally, to ferrite materials, and more particularly, to manganese-zinc ("Mn—

Zn") magnetic ferrite materials and methods of forming and employing the same that are designed to operate over a wide range of high frequencies and/or high temperatures with low power losses. It has been found that low power losses at high frequency and high temperature may be obtained from Mn—Zn materials that are a combination of major components and minor components at particular sintering conditions, as set forth herein. The materials of the present invention include oxides or compounds that convert into oxides upon heating. These materials include components of iron, manganese, and zinc, as major components, and components of silicon, calcium, and niobium (i.e. columbium), as minor components.

As illustrated in the working examples set forth herein, typically the Mn—Zn ferrite compositions of the present invention contain oxides of iron, such as $Fe_2O_3$, manganese, such as MnO, and zinc, such as ZnO, as major components, and combine amounts of oxides of calcium, such as CaO, silicon, such as $SiO_2$, and niobium, such as $Nb_2O_5$, as minor components.

The major components may be mixed such that the iron component may be present in amounts ranging from 55.5 to 58.0 mol % of the final composition, and typically in amounts ranging from 57.0 to 57.3 mol %, calculated as $Fe_2O_3$. The manganese component may be present in amounts ranging from 38.0 to 41.0 mol % of the final composition, and typically in amounts ranging from 37.0 38.0 to 39.0 mol %, calculated as MnO. The zinc component may be present in amounts ranging from 3.3 to 4.7 mol % of the final composition, and typically in amounts ranging from 4.0 to 4.7 mol %, calculated as ZnO.

To the major components are added trace, but effective, amounts of oxides (or carbonates) of calcium, silicon, and niobium. The calcium component may be added to the major components in amounts ranging from 0.030 to 0.100 wt %, based on the total weight of the ferrite material, and typically in amounts ranging from 0.030 to 0.050 wt %, calculated as CaO. The silicon component may be added to the major components in amounts ranging from 0.015 to 0.040 wt %, based on the total weight of the ferrite material, and typically in amounts ranging from 0.015 to 0.035 wt %, calculated as $SiO_2$. The niobium component may be added to the major components in amounts ranging from 0.010 to 0.030 wt %, and typically in amounts ranging from 0.020 to 0.030 wt %, based on the total weight of the ferrite material, calculated as $Nb_2O_5$.

It will be appreciated by one of ordinary skill in the art that although specific oxides for each metal component are discussed herein, other suitable oxides (or carbonates) of iron, manganese, zinc, silicon, calcium, and niobium, if applicable, may be used to form the ferrite materials of the present invention. Accordingly, although the particular metal oxides disclosed herein (ZnO, MnO, $Fe_2O_3$, CaO, $SiO_2$, and $Nb_2O_5$) have been found to provide good results in embodiments of the present invention, one of skill in the art would understand that the present invention need not be limited to the use of the specific oxidation state identified, and that other metal oxides of other oxidation states or their carbonates may be employed as a partial or complete substitute for the particular metal oxide. For example, with respect to iron oxide, the present invention may employ FeO, $Fe_2O_3$, and $Fe_3O_4$, and compounds capable of being converted into $Fe_2O_3$, such as iron hydroxide, iron oxalate, and the like; with respect to manganese oxide, the present invention may employ MnO, $MnO_2$, $Mn_3O_4$, and compounds capable of being converted into MnO, such as manganese carbonate, manganese oxalate, and the like; with respect to zinc oxide, the present invention may employ ZnO, and compounds capable of converting into ZnO, such as zinc carbonate, zinc oxalate, and the like. Accordingly, although specific metal oxides are reported to describe the components of the present invention, one of ordinary skill in the art will understand that the scope of the present invention need not be limited to only these specific components.

The ferrite materials of the present invention and the products that incorporate the same may be formed by mixing oxides or carbonates of iron, manganese, and zinc as starting materials in the amounts discussed above. Raw materials of iron, manganese, and zinc oxides or carbonates may be mixed before or after pulverization in any manner known to those of ordinary skill in the art, such as through dry blending. The raw materials may be pulverized, such as through grinding, to a particle size ranging from 0.9 μm to 1.9 μm. The raw materials often show variations in the contents of the desired components, which must be monitored and adjusted, if necessary, to the appropriate mole or weight percentage discussed above, because the sintering behavior and resultant material properties are affected by the amounts of these components.

A dispersant, such as Lomar®, commercially available from Henkel Corporation, Morristown, N.J., may be added to the dry blend along with water to form a slurry. Other dispersants known to those skilled in the art may be employed as long as the dispersant employed is relatively pure and the amount of trace impurities that may be added to the ferrite system is limited. When a dispersant is employed, the specific dispersant to raw component ratio can vary widely so long as it provides the requisite or desired viscosity for grinding, with amounts typically ranging from 0.8 wt % to 1.2 wt %.

Oxides or carbonates of calcium, silicon, and niobium may be added to the slurry in the amounts discussed above. Because relatively small amounts of each of the minor components is employed, these components are typically added in pure (i.e. at least 99.9%) powder oxide form, rather than in the raw bulk form that is used to form the blend of major components.

Additives such as polyvinyl alcohol and glycerin may be added to the slurry composition prior to milling that act as sacrificial binder materials for the pressed form. Other binder materials known to those skilled in the art may be employed as long as the binding agent chosen satisfies the relatively strict purity standards that limit the amount of trace impurities that are added to the ferrite system. Although the amount of binder material that may be added to the system can vary widely, when polyvinyl alcohol and glycerin are employed, both binder materials are typically added in amounts ranging from 1.0 to 2.0 wt %.

The slurry may be milled and spray dried to produce a granulated powder for pressing into core shapes having a predetermined shape, size, and pressed density. Typical pressed shapes include, for example, toroids, planar E-cores, and pot cores. The density of the pressed shapes typically ranges from 3.1 to 3.3 g/cm³. The cores may be sintered at temperatures ranging from 1130° C. to 1180° C. and then cooled to temperatures ranging from 20° C. to 30° C. to form the sintered core material. The oxygen content of the atmosphere should be controlled during the cooling portion of the cycle based on the temperature and rate of cooling, as known to those of ordinary skill in the art.

As illustrated in the Example and Tables 1 and 2, it has been found that the Mn—Zn ferrite materials that combine components of iron, such as $Fe_2O_3$, manganese, such as MnO, and zinc, such as ZnO, as major components, and components of silicon, such as $SiO_2$, calcium, such as CaO, and niobium, such as $Nb_2O_5$, as minor components, in the amounts discussed above, provide improved properties relative to known ferrite materials. In particular, the compositions of the present invention have relatively low ZnO content and a high $Fe_2O_3$ content compared to typical Mn—Zn ferrites, and further combines amounts of CaO, $SiO_2$, and $Nb_2O_5$ to control and limit power losses. It has been found that the combination of these components result in a material having improved ferrite properties.

The present invention will be described further by reference to the following example. The following examples are merely illustrative of the invention and are not intended to be limiting. Unless otherwise indicated, all parts are by weight.

EXAMPLES

Raw materials of Fe, Mn, and Zn oxides were dry blended and ground 1½ hours in an attrition mill to an average particle size of approximately 1.40 μm. An addition of 1.0 weight percent Lomar® (Henkel Corporation) was added at the beginning of the grinding operation to act as a dispersant. Oxides or carbonates of Ca, Si, and Nb were also added at the beginning of the grinding operation. Before the resulting slurry was removed from the mill, 1.5 weight percent polyvinyl alcohol and 1.5 weight percent glycerin were added to the slurry. The slurry was milled for another 15 minutes and then spray dried to produce a granulated powder for pressing.

Test cores were pressed in the shape of toroids having an outside diameter of 22 mm, an inside diameter of 13.7 mm and a height of 6.3 mm.

The pressed density of the cores was 3.20 g/cc. The test cores were sintered at 1160° C. for 5 hours. The oxygen content of the atmosphere was controlled during the cooling portion of the cycle. Temperatures as low as 1130° C. have been found to form acceptable material.

Compositions of the present invention are listed below in Table 1.

TABLE 1

| Lot No. | $Fe_2O_3$ (mol %) | MnO (mol %) | ZnO (mol %) | CaO (wt %) | $SiO_2$ (wt %) | $Nb_2O_5$ (wt %) | $Co_3O_4$ (wt %) | $TiO_2$ (wt %) | Other (wt %) |
|---|---|---|---|---|---|---|---|---|---|
| 1 | 56.90 | 39.05 | 4.05 | 0.045 | 0.020 | 0.030 | — | — | — |
| 2 | 56.90 | 39.05 | 4.05 | 0.090 | 0.020 | 0.030 | — | — | — |
| 3 | 57.00 | 39.00 | 4.00 | 0.040 | 0.020 | 0.025 | — | — | — |
| 4 | 57.50 | 38.55 | 3.95 | 0.037 | 0.020 | 0.027 | — | — | — |
| 5 | 56.85 | 39.20 | 3.95 | 0.037 | 0.020 | 0.027 | — | — | — |
| 6 | 57.45 | 38.15 | 4.40 | 0.037 | 0.020 | 0.027 | — | — | — |
| 7 | 56.40 | 39.15 | 4.45 | 0.037 | 0.020 | 0.027 | — | — | — |
| 8 | 55.55 | 40.50 | 3.95 | 0.037 | 0.020 | 0.027 | — | — | — |
| 9 | 56.80 | 39.85 | 3.35 | 0.037 | 0.020 | 0.027 | — | — | — |
| 10 | 56.35 | 40.15 | 3.50 | 0.037 | 0.020 | 0.027 | — | — | — |
| 11 | 56.80 | 39.15 | 4.05 | 0.037 | 0.020 | 0.027 | — | — | — |
| 12 | 57.45 | 39.00 | 3.55 | 0.037 | 0.020 | 0.027 | — | — | — |
| 13 | 56.95 | 38.35 | 4.70 | 0.037 | 0.020 | 0.027 | — | — | — |
| 14 | 57.05 | 38.75 | 4.20 | 0.040 | 0.025 | 0.025 | — | — | — |
| 15 | 57.15 | 38.15 | 4.70 | 0.040 | 0.025 | 0.025 | — | — | — |
| 16 | 57.15 | 38.15 | 4.70 | 0.040 | 0.020 | 0.040 | — | — | — |
| 17 | 51.15 | 38.15 | 4.70 | 0.040 | 0.020 | 0.010 | — | — | — |
| 18 | 57.15 | 38.15 | 4.70 | 0.040 | 0.030 | 0.025 | — | — | — |
| 19 | 57.15 | 38.15 | 4.70 | 0.040 | 0.010 | 0.025 | — | — | — |
| Comparative Examples | | | | | | | | | |
| 20 | 57.00 | 39.00 | 4.00 | 0.100 | 0.020 | — | — | — | 0.05 $Ta_2O_5$ |
| 21 | 57.00 | 39.00 | 4.00 | 0.100 | 0.020 | — | — | — | 0.05 $GeO_2$ |
| 22 | 55.00 | 39.00 | 6.00 | 0.100 | 0.020 | — | — | — | 0.05 $GeO_2$ |
| 23 | 57.45 | 36.98 | 5.57 | 0.098 | 0.030 | 0.020 | 0.184 | 0.331 | — |
| 24 | 56.48 | 38.00 | 5.52 | 0.105 | 0.027 | 0.022 | 0.195 | 0.351 | — |
| 25 | 56.95 | 38.85 | 4.20 | 0.040 | 0.060 | 0.030 | — | — | — |
| 26 | 53.50 | 33.99 | 11.38 | 0.056 | 0.020 | 0.016 | 0.149 | 0.580 | — |

TABLE 2

| Lot No. | Perm @ 100 kHz | Bmax @ 15 Oe. 25° C. (kG) | Bmax @ 15 Oe. 100° C. (kG) | Temp. of Min Watt Loss (° C.)[1] | Watt Loss @ 0.5 MHz, 500G (mw/cc)[1] | Watt Loss @ 1 MHz, 500G (mw/cc)[1] | Watt Loss @ 3 MHz, 100G (mw/cc)[1] | Curie Temp (° C.) |
|---|---|---|---|---|---|---|---|---|
| 1 | 830 | 5.00 | 4.45 | 120 | 100 | 350 | 130 | 280 |
| 2 | 790 | 5.05 | 4.45 | 120 | 170 | 465 | 160 | 280 |
| 3 | 745 | 5.05 | 4.41 | 120 | 105 | 375 | 130 | 285 |
| 4 | 735 | 5.20 | 4.45 | 100 | 110 | 400 | 105 | 290 |
| 5 | 725 | 5.10 | 4.40 | 120 | 110 | 400 | 125 | 285 |
| 6 | 755 | 5.15 | 4.45 | 100 | 115 | 380 | 105 | 285 |
| 7 | 740 | 5.05 | 4.35 | 120 | 118 | 420 | 165 | 280 |
| 8 | 630 | 4.95 | 4.30 | 140 | 160 | 630 | 300 | 270 |

TABLE 2-continued

| Lot No. | Perm @ 100 kHz | Bmax @ 15 Oe. 25° C. (kG) | Bmax @ 15 Oe. 100° C. (kG) | Temp. of Min Watt Loss (° C.)[1] | Watt Loss @ 0.5 MHz, 500G (mw/cc)[1] | Watt Loss @ 1 MHz, 500G (mw/cc)[1] | Watt Loss @ 3 MHz, 100G (mw/cc)[1] | Curie Temp (° C.) |
|---|---|---|---|---|---|---|---|---|
| 9 | 670 | 5.10 | 4.45 | 120 | 130 | 430 | 135 | 290 |
| 10 | 660 | 5.05 | 4.35 | 140 | 120 | 450 | 180 | 270 |
| 11 | 735 | 5.15 | 4.40 | 120 | 105 | 390 | 125 | 285 |
| 12 | 710 | 5.15 | 4.55 | 100 | 115 | 395 | 105 | 285 |
| 13 | 780 | 5.15 | 4.45 | 120 | 105 | 375 | 120 | 280 |
| 14 | 750 | 5.20 | 4.55 | 120 | 95 | 320 | 100 | 280 |
| 15 | 800 | 5.25 | 4.55 | 100 | 85 | 315 | 90 | 280 |
| 16 | 570 | 5.30 | 4.61 | 110 | 533 | 1625 | 725 | 280 |
| 17 | 825 | 5.15 | 4.46 | 100 | 80 | 310 | 120 | 280 |
| 18 | 380 | 5.35 | 4.68 | 100 | 1125 | 4650 | 1390 | 280 |
| 19 | 800 | 5.07 | 4.39 | 110 | 85 | 330 | 125 | 280 |
| Comparative Examples | | | | | | | | |
| 20 | 760 | 5.00 | 4.37 | 120 | 100 | 440 | 220 | 275 |
| 21 | 785 | 5.21 | 4.51 | 100 | 113 | 500 | 205 | 275 |
| 22 | 734 | 4.59 | 3.86 | 100 | 267 | 1005 | 310 | 250 |
| 23 | 224 | 3.54 | 3.05 | 40 | 2190 | 5492 | 200 | 250 |
| 24 | 980 | 5.21 | 4.34 | 25 | 110 | 360 | 35 | 270 |
| 25 | 475 | 5.30 | 4.64 | 120 | 480 | 1340 | 360 | 270 |
| 26 | 1470 | 4.60 | 3.90 | 60 | 109 | 494 | 244 | 240 |

[1]All watt loss measurements were taken at the temperature where the minimum watt loss occurs.

As shown in the Example, in corresponding Tables 1 and 2, and as discussed above, the ferrite materials of the present invention combine components of iron, such as $Fe_2O_3$, manganese, such as MnO, and zinc, such as ZnO, as major components, and components of silicon, such as $SiO_2$, calcium, such as CaO, and niobium, such as $Nb_2O_5$, as minor components, in specified amounts, to provide improved properties relative to known ferrite materials. The present invention demonstrates that large additions of CaO and other components ultimately serve to increase the power losses at high frequencies. Lot No. 25, for example, is provided as a comparative example, and illustrates the poor results obtained when a composition having component amounts (in this case 0.06 wt % $SiO_2$) outside of the disclosed ranges are prepared and tested.

Compositions of the present invention control and limit power losses and result in a material having a low permeability and a high Curie temperature. The materials of the present invention can limit, or substantially eliminate, the addition of large amounts of $Co_3O_4$, $SnO_2$, $TiO_2$, CaO, and the like, or combinations of these components, while achieving exceptionally good material properties. Accordingly, sintering the combination of major and minor components provides ferrite materials of the present invention having more consistent material properties relative to known compositions because of their lesser degree of sensitivity to firing conditions.

It has been found that embodiments of the present invention provide a ferrite material with a permeability ($\mu$) of less than 830, and more typically ranging from 700 to 800 at 25° C. In addition, it has been found that embodiments of the present invention provide a ferrite material with a Curie temperature of greater than 250° C., typically 270° C. or greater, and more particularly 280° C. or greater.

The relatively high Curie temperatures obtained in embodiments of the present invention also improve the flux density versus temperature response of the material. Measurements taken of embodiments of the present invention indicate maximum magnetic flux densities ($B_{max}$) range from 3500 to 4500 G, and are typically greater than 4000 G, at 100° C., which is significantly higher than known Mn—Zn ferrite materials designed for high frequency applications of between 250 kHz to 3 MHz.

As illustrated in the test results, at temperatures between 100° C. and 140° C., embodiments of the present invention limit, or substantially reduce, the power loss at 0.5 MHz, 1 MHz, and 3 MHz, relative to known ferrite materials. Measurements of power losses of embodiments of the present invention indicate that power losses in certain embodiments are below 100 mW/cm$^3$.

Power losses of sintered compositions of the present invention were measured by winding the toroid test samples with the appropriate number of turns and then applying a sine wave voltage at the desired frequency and at an amplitude sufficient to generate the desired flux density in the core. The current (I) required to achieve the set voltage (V) was then measured as was the phase angle ($\theta$) between the applied voltage and the measured current. Power losses are expressed as: P=VI cos $\theta$. The power in watts is divided by the volume of the test specimen to obtain a normalized power loss in milliwatts per cubic centimeter of material (mW/cm$^3$). This loss measurement includes losses due to the copper windings, which were assumed to be small.

Power losses at 0.5 MHz were measured to be below 170 mW/cm$^3$, and typically ranged from 85 mW/cm$^3$ to 130 mW/cm$^3$. In particular, test results show that the ferrite compositions of the present invention may be used to form a sintered material comprised of the ferrite material having a power loss of below 170 mW/cm$^3$ at a frequency of 0.5 MHz and a magnetic flux density of 500 G at a temperature range between 80° C. and 140° C.

Power losses at 1.0 MHz were typically measured to be below 465 mW/cm$^3$, and more particularly ranged from 315 mW/cm$^3$ to 400 mW/cm$^3$. In particular, test results show that the ferrite compositions of the present invention may be used to form a sintered material comprised of the ferrite material having a power loss of below 465 mW/cm$^3$ at a frequency of 1.0 MHz and a magnetic flux density of 500 G at a temperature range between 80° C. and 140° C.

Power losses at 3.0 MHz were measured to be below 300 mW/cm$^3$, and more typically ranged from 90 mW/cm$^3$ to 180 mW/cm³. In particular, test results show that the ferrite compositions of the present invention may be used to form a sintered material comprised of the ferrite material and having a power loss of below 300 mW/cm³ at a frequency of 3.0 MHz and a magnetic flux density of 100 G at a temperature range between 80° C. and 140° C.

In some embodiments, test results show that the ferrite materials of the present invention may be used to form a sintered material having a power loss at or below 100 mW/cm³ at a temperature between 80° C. and 140° C. and a frequency of 250 kHz.

It has been found that certain embodiments of the present invention have been successful at simultaneously achieving low power losses above 500 kHz, minimum power loss at a temperature of 100° C. or greater, saturation magnetic flux density greater than 4300 G at 100° C., a Curie temperature greater than 270° C., while providing relative ease of processing. Prior art techniques have not been successful in meeting this combination of the performance criteria. The present invention not only meets all of these requirements but also uses a much simpler composition than anything found in the prior art. The end result is a magnetic material with superior performance that is simple to process.

Compositions of the present invention that use the combination of the oxides (or carbonates) described herein, particularly those compositions that employ $Nb_2O_5$ and relatively low amounts of CaO, result in ferrite materials having improved chemical and physical properties, as illustrated in Example 1 and Tables 1 and 2. Accordingly, improvements to the magnetic flux density, and power loss at high operating frequencies between 250 kHz to 3 MHz allow reduction in the magnetic cross section of the core materials that employ the compositions of the present invention.

Test results of the materials of the present invention show that there is another composition region in which $B_{max}$ can be increased above 5000 G at 25° C. and increased above 4000 G at 100° C. It has also been found that relative to the materials of the present invention, prior art materials do not achieve the same level of performance and are more difficult to process. The present invention demonstrates that fewer additive additions at much lower concentrations are more effective at reducing power losses even though the resistivity of the material may not be increased. Also, as shown in the comparative results below, a reduction in grain size is not a prerequisite for low losses.

| Lot No. | Grain Size | Resistivity @ 1 MHz | Watt Loss @ 1 MHz, 500 G |
|---|---|---|---|
| 15 | 8–9 μm | 118 ohm-cm | 315 (mW/cm³) |
| Comparative Example 26 | 3–4 μm | 248 ohm-cm | 494 (mW/cm³) |

Although embodiments of the present invention identified in the Example are identified as only having components of iron, such as $Fe_2O_3$, manganese, such as MnO, and zinc, such as ZnO, as major components, and components of silicon, such as $SiO_2$, calcium, such as CaO, and niobium, such as $Nb_2O_5$, as minor components, it is contemplated that the Mn—Zn ferrite materials of the present invention may include these components, ranging in amounts described herein, as well as other minor components know to those skilled in the art that impart desirable properties to the material.

It will be appreciated by those of ordinary skill in the art that the improved properties of the materials of the present invention allow these materials to be incorporated into products that require high frequency operation, such as those related to commercial switching power supplies, as well as for household electric appliances, communication and telecommunication equipment, computer and peripheral equipment, electronics finished products, electronic components, down hole oil drilling sensors, automotive applications, and other high frequency electronic circuitry. Embodiments of the present invention provide for high temperature operation of 100° C. or higher, with low power losses at high flux densities and high frequencies that provide increased power performance to be added to products having a limited area, that will allow for miniaturization of the core volume.

It will also be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

Therefore, we claim:

1. A method of forming a ferrite material, comprising:
mixing as main components, an iron component ranging from 55.5 to 58.0 mole percent calculated as $Fe_2O_3$, an amount of manganese component ranging from 38.0 to 41.0 mole percent calculated as MnO, and an amount of zinc component ranging from 3.3 to 4.7 mole percent calculated as ZnO;
mixing with the main components minor components, an amount of calcium component ranging from 0.030 to 0.100 weight percent calculated as CaO, an amount of silicon component ranging from 0.015 to 0.040 weight percent calculated as $SiO_2$, and an amount of niobium component ranging from 0.010 to 0.030 weight percent calculated as $Nb_2O_5$;
wherein the major components and minor components of the raw materials are pulverized to a particle size ranging from 0.9μ to 1.9μ; and
heat treating the major components and the minor components to form the ferrite material.

2. The method according to claim 1, wherein the amount of iron oxide ranges from 57.0 to 57.3 mole percent.

3. The method according to claim 1, wherein the amount of manganese oxide ranges from 38.0 to 39.0 mole percent.

4. The method according to claim 1, wherein the amount of zinc oxide ranges from 4.0 to 4.7 mole percent.

5. The method according to claim 1, wherein the amount of calcium oxide ranges from 0.030 to 0.050 weight percent.

6. The method according to claim 1, wherein the amount of silicon oxide ranges from 0.015 to 0.035 weight percent.

7. The method according to claim 1, wherein the amount of niobium oxide ranges from 0.020 to 0.030 weight percent.

8. The method according to claim 1, wherein the ferrite material has a Curie temperature greater than 250° C.

9. The method of claim 8, wherein the ferrite material has a Curie temperature of 270° C. or greater.

10. The method of claim 9, wherein the ferrite material has a Curie temperature of 280° C. or greater.

11. The method according to claim 1, wherein the ferrite material has a power loss of below 170 mW/cm³ at a frequency of 0.5 MHz and a magnetic flux density of 500 G at a temperature range between 80° C. and 140° C.

12. The method of claim 11, wherein the power loss ranges from 85 mW/cm³ and 130 mW/cm³.

13. The method of claim 12, wherein the power loss is below 100 mW/cm$^3$.

14. The method according to claim 1, wherein the ferrite material has a power loss of below 465 mW/cm$^3$ at a frequency of 1.0 MHz and a magnetic flux density of 500 G at a temperature range between 80° C. and 140° C.

15. The method of claim 14, wherein the power loss ranges from 315 mW/cm$^3$ to 400 mW/cm$^3$.

16. The method according to claim 1, wherein the ferrite material has a power loss of below 300 mW/cm$^3$ at a frequency of 3.0 MHz and a magnetic flux density of 100 G at a temperature range between 80° C. and 140° C.

17. The method of claim 16, wherein the power loss ranges from 90 mW/cm$^3$ to 180 mW/cm$^3$.

18. The method according to claim 1, wherein the ferrite material has a power loss of below 100 mW/cm$^3$ at a frequency of 0.5 MHz and a magnetic flux density of 500 G at a temperature range between 80° C. and 140° C.

19. The method according to claim 1, wherein the ferrite material has a power loss at or below 100 mW/cm$^3$ at a temperature between 80° C. and 140° C. and a frequency of 250 kHz.

* * * * *

UNITED STATES PATENT AND TRADEMARK OFFICE
CERTIFICATE OF CORRECTION

| | | |
|---|---|---|
| PATENT NO. | : 6,858,155 B1 | Page 1 of 1 |
| APPLICATION NO. | : 10/020819 | |
| DATED | : February 22, 2005 | |
| INVENTOR(S) | : Fanton et al. | |

It is certified that error appears in the above-identified patent and that said Letters Patent is hereby corrected as shown below:

Cover Page, item (56), references cited, U.S. Patent 3,481,876: delete "Hiraag" and substitute --Hiraga-- therefor.

Column 5, line 27, delete "38.0".

Signed and Sealed this

Twenty-ninth Day of May, 2007

JON W. DUDAS
*Director of the United States Patent and Trademark Office*